United States Patent
Fleischer et al.

(10) Patent No.: US 9,427,815 B2
(45) Date of Patent: Aug. 30, 2016

(54) MACHINE TOOL FOR PRODUCING TOOTHED SECTIONS ON WORKPIECES

(75) Inventors: Holger Fleischer, Augustusburg (DE); Carlo Schonherr, Leubsdorf (DE)

(73) Assignee: MAG IAS GmbH, Goppingen (DE)

( * ) Notice: Subject to any disclaimer, the term of this patent is extended or adjusted under 35 U.S.C. 154(b) by 352 days.

(21) Appl. No.: 14/344,616

(22) PCT Filed: Sep. 14, 2012

(86) PCT No.: PCT/EP2012/068078
§ 371 (c)(1),
(2), (4) Date: Mar. 13, 2014

(87) PCT Pub. No.: WO2013/037947
PCT Pub. Date: Mar. 21, 2013

(65) Prior Publication Data
US 2014/0341669 A1     Nov. 20, 2014

(30) Foreign Application Priority Data
Sep. 16, 2011   (DE) .......................... 10 2011 082 831

(51) Int. Cl.
*B23F 23/04*   (2006.01)
*B23F 23/06*   (2006.01)
(Continued)

(52) U.S. Cl.
CPC . *B23F 5/20* (2013.01); *B23F 5/22* (2013.01);
*B23F 23/04* (2013.01); *B23Q 1/01* (2013.01);
(Continued)

(58) Field of Classification Search
CPC .......... Y10T 409/100795; Y10T 409/100954;
Y10T 29/5128; Y10T 483/1736; B23F 23/04;
B23F 23/02
USPC .............................. 409/6, 7; 29/38 A; 483/31
See application file for complete search history.

(56) References Cited

U.S. PATENT DOCUMENTS

| | | | | |
|---|---|---|---|---|
| 2,343,407 A | * | 3/1944 | Galloway | ............... B23F 19/00 29/38 C |
| 2,585,271 A | * | 2/1952 | Praeg | ..................... B21H 5/022 29/38 A |

(Continued)

FOREIGN PATENT DOCUMENTS

| | | |
|---|---|---|
| DE | 844392 | 7/1952 |
| DE | 964197 | 5/1957 |

(Continued)

OTHER PUBLICATIONS

English Translation of claim 1 of: German patent No. 1017885; German patent No. 844392; German patent No. 964197; 1 page.

(Continued)

*Primary Examiner* — Erica E Cadugan
(74) *Attorney, Agent, or Firm* — Reising Ethington P.C.

(57) ABSTRACT

To produce toothed sections on workpieces, a machine tool has a machine bed, a pivoting element with at least two workpiece spindles arranged thereon and a tool positioning unit with a tool head. The spindles can be pivoted relative to the machine bed about a workpiece spindle pivot axis and each spindle has a workpiece receiver that can be rotatably driven about a rotational axis. The tool head can be linearly moved in three directions relative to the spindles, and can be pivoted about a tool head pivot axis. A bearing element extending in the direction of the workpiece spindle pivot axis, has a free end which is pivotable about the workpiece spindle pivot axis, and is rigidly arranged on the pivoting element. A reinforcing element is fastened to the machine bed. The pivoting element is reinforced about the workpiece spindle pivot axis by the reinforcing element.

18 Claims, 4 Drawing Sheets

(51) Int. Cl.
*B23F 5/22* (2006.01)
*B23Q 1/01* (2006.01)
*B23F 5/20* (2006.01)
*B23Q 7/02* (2006.01)
*B23Q 1/26* (2006.01)
*B23Q 3/157* (2006.01)
*B23F 23/12* (2006.01)

(52) U.S. Cl.
CPC . *B23Q 1/26* (2013.01); *B23Q 7/02* (2013.01); *B23F 23/06* (2013.01); *B23F 23/1243* (2013.01); *B23Q 3/15706* (2013.01); *Y10T 29/5128* (2015.01); *Y10T 409/10159* (2015.01); *Y10T 409/10477* (2015.01); *Y10T 409/100795* (2015.01); *Y10T 409/100954* (2015.01); *Y10T 409/103021* (2015.01); *Y10T 409/109699* (2015.01); *Y10T 483/16* (2015.01); *Y10T 483/1736* (2015.01)

(56) References Cited

U.S. PATENT DOCUMENTS

| | | | | |
|---|---|---|---|---|
| 2,585,272 | A * | 2/1952 | Praeg | B23F 23/12 29/38 A |
| 3,177,773 | A * | 4/1965 | Gunther | B23D 79/00 409/8 |
| 5,452,502 | A * | 9/1995 | Walter | B23Q 1/5437 29/38 A |
| 6,176,656 | B1 | 1/2001 | Seong | |
| 8,006,359 | B2 | 8/2011 | Jaeger | |
| 2002/0197121 | A1* | 12/2002 | Mall | B23F 19/00 409/9 |
| 2005/0143236 | A1 | 6/2005 | Nakazawa et al. | |
| 2009/0175696 | A1* | 7/2009 | Jaeger | B23F 5/20 409/31 |
| 2010/0072688 | A1 | 3/2010 | Hobel | |
| 2010/0221080 | A1* | 9/2010 | Neumaier | B23F 5/04 409/13 |
| 2013/0223945 | A1* | 8/2013 | Kato | B23F 23/04 409/6 |

FOREIGN PATENT DOCUMENTS

| | | |
|---|---|---|
| DE | 1017885 | 10/1957 |
| DE | 102006019325 B3 | 9/2007 |
| DE | 102010028032 A1 | 10/2011 |
| DE | 102013008709 A1 * | 11/2014 |
| EP | 2165798 A1 | 3/2010 |
| JP | 03-245938 A * | 11/1991 |

OTHER PUBLICATIONS

PCT/EP2012/068078 International Search Report; dated Jun. 6, 2013; 9 pages.

* cited by examiner

US 9,427,815 B2

MACHINE TOOL FOR PRODUCING TOOTHED SECTIONS ON WORKPIECES

CROSS-REFERENCES TO RELATED APPLICATIONS

This application is a National Stage entry under 35 USC 371 of International Application No. PCT/EP2012/068078, filed Sep. 14, 2012, which claims foreign priority benefits under 35 U.S.C. 119(a)-(d) of German Application No. 10 2011 082 831.1 filed Sep. 16, 2011. The disclosure of each is expressly incorporated by reference herein in its entirety.

FIELD OF THE INVENTION

The invention relates to a machine tool for producing toothed sections on workpieces.

BACKGROUND OF THE INVENTION

A machine tool having two workpiece spindles for machining toothed sections for workpieces is known from DE 10 2006 019 325 B3 (corresponds to U.S. Pat. No. 8,006,359 B2). The workpiece spindles are arranged on a rotary holder, which is fastened on the machine bed and can be rotated about a horizontal pivot axis. Arranged laterally next to the workpiece spindles is a tool head with a hob received therein, which can be linearly moved relative to the workpiece spindles in three directions by means of a tool positioning unit and can be pivoted about a horizontal pivot axis. It is possible to achieve a short downtime in the machining of the toothed sections owing to the two workpiece spindles.

SUMMARY OF THE INVENTION

An object of the invention is to develop a machine tool of the generic type in such a way that the machining precision during the workpiece machining is easily improved.

BRIEF DESCRIPTION OF THE INVENTION

This object is achieved by a machine tool for producing toothed sections on workpieces, comprising a machine bed, a pivoting element with at least two workpiece spindles arranged thereon, wherein the at least two workpiece spindles are pivotable relative to the machine bed about a workpiece spindle pivot axis of the pivoting element and in each case have a workpiece receiver that is rotatably drivable about a rotational axis for a workpiece to be toothed, a tool positioning unit with a tool head arranged thereon, wherein the tool head is linearly movable relative to the at least two workpiece spindles in three directions and is pivotable about a tool head pivot axis, wherein a bearing element extending in the direction of the workpiece spindle pivot axis is rigidly arranged on the pivoting element, a free end of the bearing element is pivotably mounted about the workpiece spindle pivot axis on a reinforcing element, and the reinforcing element is fastened to the machine bed.

A two-sided mounting of the pivoting element is achieved by the bearing element arranged on the pivoting element. For this purpose, the bearing element is pivotably mounted by its free end about the workpiece spindle pivot axis on a reinforcing element, which is in turn fastened for two-sided mounting of the pivoting element on the machine bed. Owing to the two-sided mounting of the pivoting element and the at least two workpiece spindles arranged thereon, the rigidity, the thermal behavior and the vibration resistance of the machine tool are significantly improved during the production and/or machining of toothed sections on workpieces, so a higher machining precision can be achieved. In particular, the pivoting element is reinforced by means of the reinforcing element about the workpiece spindle pivot axis, so forces and vibrations occurring during machining are better absorbed by means of the reinforcing element and can be guided away into the machine bed. The machine bed, the pivoting element with the bearing element arranged thereon and the reinforcing element preferably form a closed frame structure or a closed reinforcing frame. Owing to the two-sided mounting of the pivoting element and the workpiece spindles arranged thereon, the machining precision can thus be improved and/or the machining speed increased. By increasing the machining speed, short machining times are achieved as well as short downtimes due to the at least two workpiece spindles. The machine tool therefore has a high productivity.

A machine tool in which the machine bed, together with the pivoting element and the bearing element arranged thereon as well as the reinforcing element, forms a reinforcing frame, which limits a working space to four sides ensures a high machining precision. Since the machine bed, the pivoting element with the bearing element arranged thereon and the reinforcing element form a reinforcing frame, which limits the working space to four sides, forces and vibrations occurring during the workpiece machining are guided away into the machine bed in a simple and reliable manner.

A machine tool in which the tool positioning unit is mounted on the reinforcing element easily ensures a high machining precision. By arranging the tool positioning unit on the reinforcing element, said positioning unit is also mounted on two sides, so forces and vibrations occurring during the machining can be guided away via the reinforcing element and the bearing element into the machine bed. Moreover, the structure of the machine tool is compact, so a high rigidity and machining precision are additionally ensured.

A machine tool in which the reinforcing element is L-shaped and has a stand, which is rigidly fastened to the machine bed and extends in a vertical z-direction, as well as a cross member connecting the stand to the bearing element easily ensures the configuration of a closed frame structure or a reinforcing frame, whereby the high machining precision is ensured.

A machine tool in which the workpiece spindle pivot axis runs in a vertical z-direction and the pivoting element, together with the bearing element, forms a pivotable counter-stand ensures a compact structure of the machine tool, so a high degree of rigidity and machining precision are achieved. The pivotable counter-stand is connected by the cross member to the stand rigidly fastened to the machine bed and thus forms, together with the machine bed, a reinforcing frame, which limits a working space in the form of a through-opening to four sides. The rotational axes of the at least two workpiece spindles preferably run parallel to the workpiece spindle pivot axis or the z-direction.

A machine tool in which the reinforcing element is a least partially frame-shaped, wherein in particular a stand of the reinforcing element is frame-shaped and the tool positioning unit is mounted in a through-opening of the stand easily ensures a two-sided mounting of the pivoting element. Owing to the at least partially frame-shaped configuration of the reinforcing element or owing to the frame-shaped configuration of the stand, with substantially the same rigidity, the material outlay is reduced and/or installation space is provided for the tool positioning unit in order to mount the latter on the reinforcing element or the stand. An additional reinforcement is moreover achieved by the tool positioning unit.

A machine tool in which a z-slide, which is linearly movable in the z-direction by means of a z-drive motor, is arranged on the stand, in which an x-slide, which is linearly movable in a horizontal x-direction by means of an x-drive motor, is arranged on the z-slide, in which a pivoting part, which is pivotable by means of an a-drive motor about the tool head pivot axis running parallel to the x-direction, is arranged on the x-slide, in which a y-slide, which is linearly movable transverse to the x- and z-direction by means of a y-drive motor, is arranged on the pivoting part, and in which the tool head is arranged on the y-slide easily and rapidly ensures a positioning of the tool head relative to the workpiece spindles and the workpieces received therein.

A machine tool in which the tool head has a rotatably drivable tool receiver and a rotatable tool counter-receiver for a hob, which are linearly movable relative to one another to clamp and release the hob, owing to the two-sided mounting of the hob, ensures a high machining precision. Since the tool receiver and the tool counter-receiver can be linearly moved relative to one another, it is easily possible to clamp and release the hob.

A machine tool in which a rotatable workpiece counter-receiver is in each case arranged concentrically with respect to the rotational axis of the associated workpiece spindle on the bearing element and, in particular, is linearly movable in the z-direction easily ensures the machining of undulating workpieces with a high machining precision. The bearing element allows workpiece counter-receivers to be arranged concentrically with respect to the rotational axis of the respectively associated workpiece spindle, so undulating workpieces can be mounted on two sides. To clamp and release the workpieces and to machine workpieces of different lengths, the workpiece counter-receivers are preferably arranged so as to be linearly movable on the bearing element.

A machine tool in which the bearing element together with the pivoting element, in particular a counter-stand, is frame-shaped easily ensures a high machining precision during the machining of workpieces. Owing to the frame-shaped configuration, with substantially the same rigidity, the material outlay is reduced and/or installation space is provided for the arrangement of the workpiece counter-receivers, in which said workpiece counter-receivers can be mounted. An additional reinforcement is moreover achieved by the workpiece counter-receivers.

A machine tool in which a tool magazine is arranged on the bearing element easily ensures an automatic tool change. The bearing element easily allows the arrangement of a tool magazine with tool holders arranged next to one another and/or above one another. By rotating the pivoting element and the bearing element arranged thereon by, for example, 90°, the tool magazine can be made to face the tool head, so an automatic tool change can easily be carried out by means of the tool positioning unit.

Further features, advantages and details of the invention emerge from the following description of an embodiment.

DESCRIPTION OF THE PREFERRED EMBODIMENTS

Figure 1:
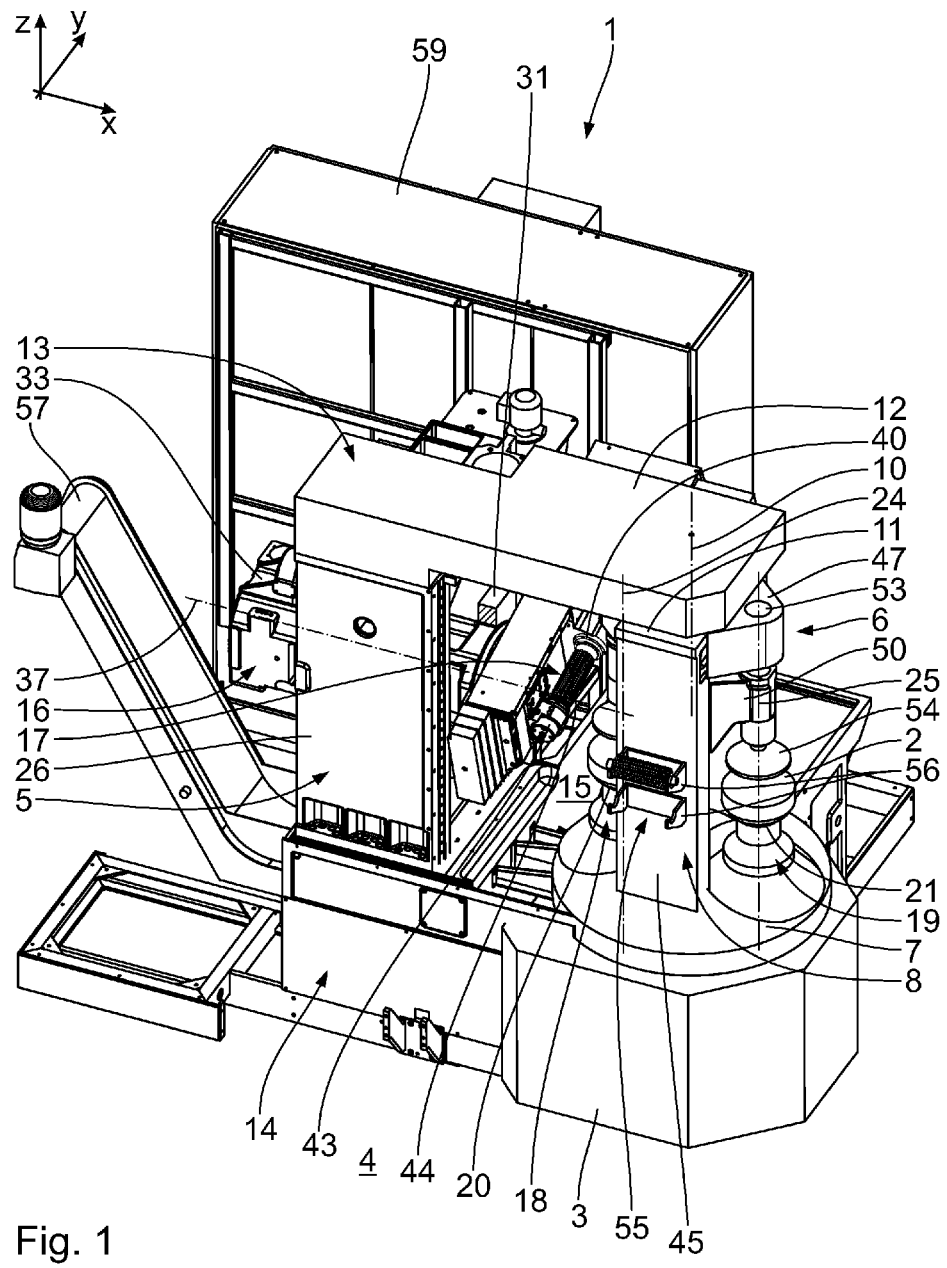
FIG. 1 shows a perspective view of a machine tool for producing toothed sections on workpieces.
Figure 2:
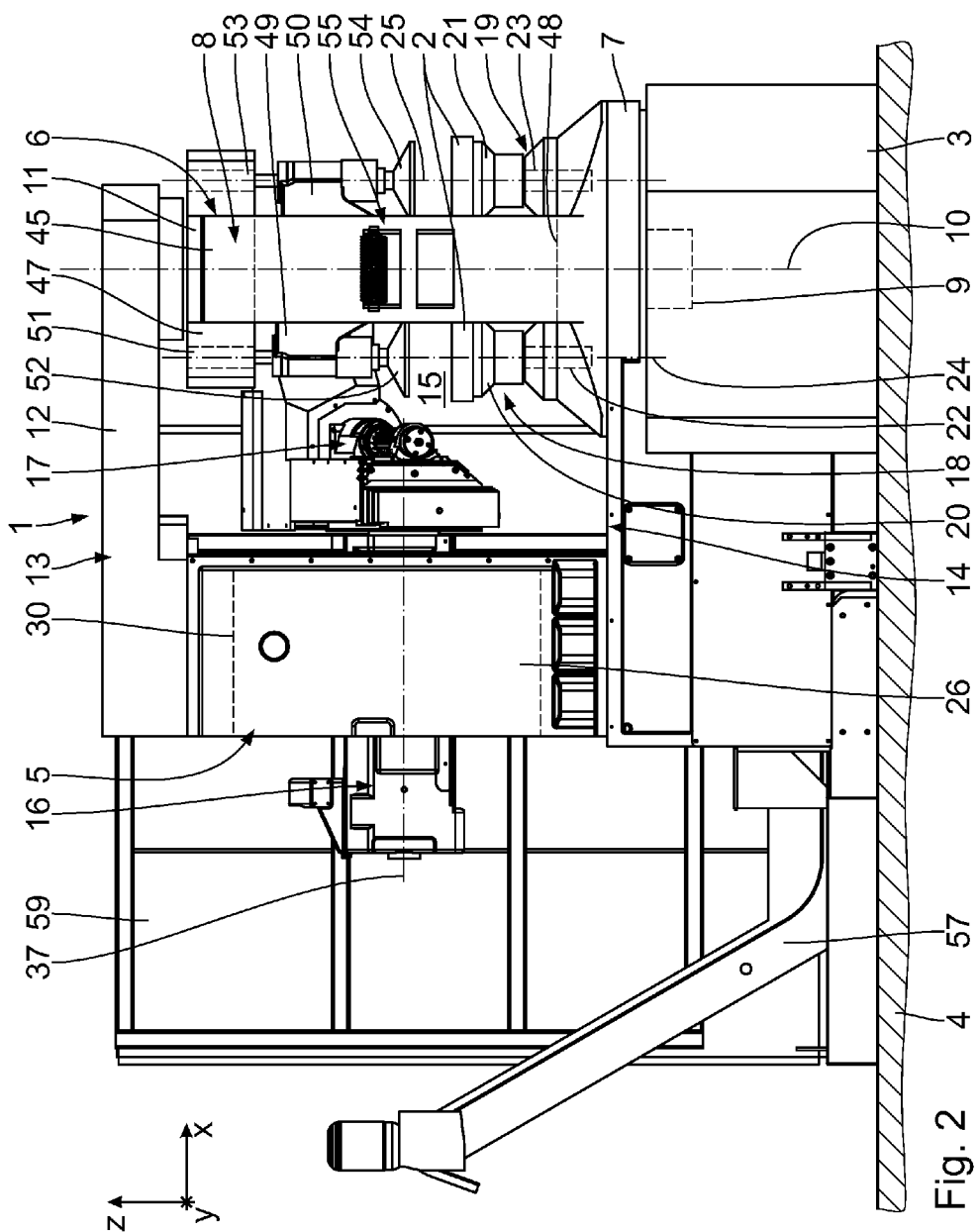
FIG. 2 shows a front view of the machine tool in FIG. 1.
Figure 3:
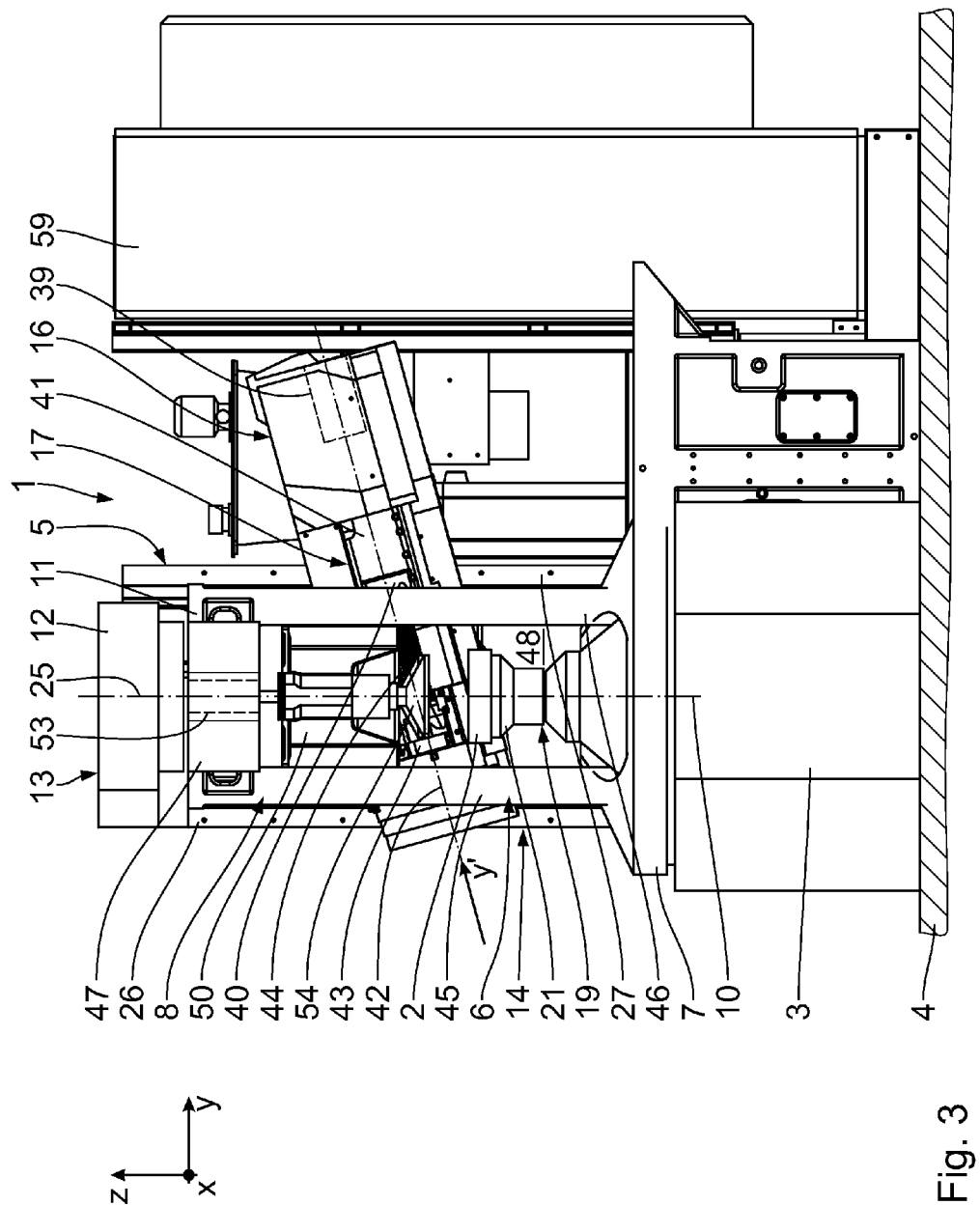
FIG. 3 shows a side view of the machine tool in FIG. 1.
Figure 4:
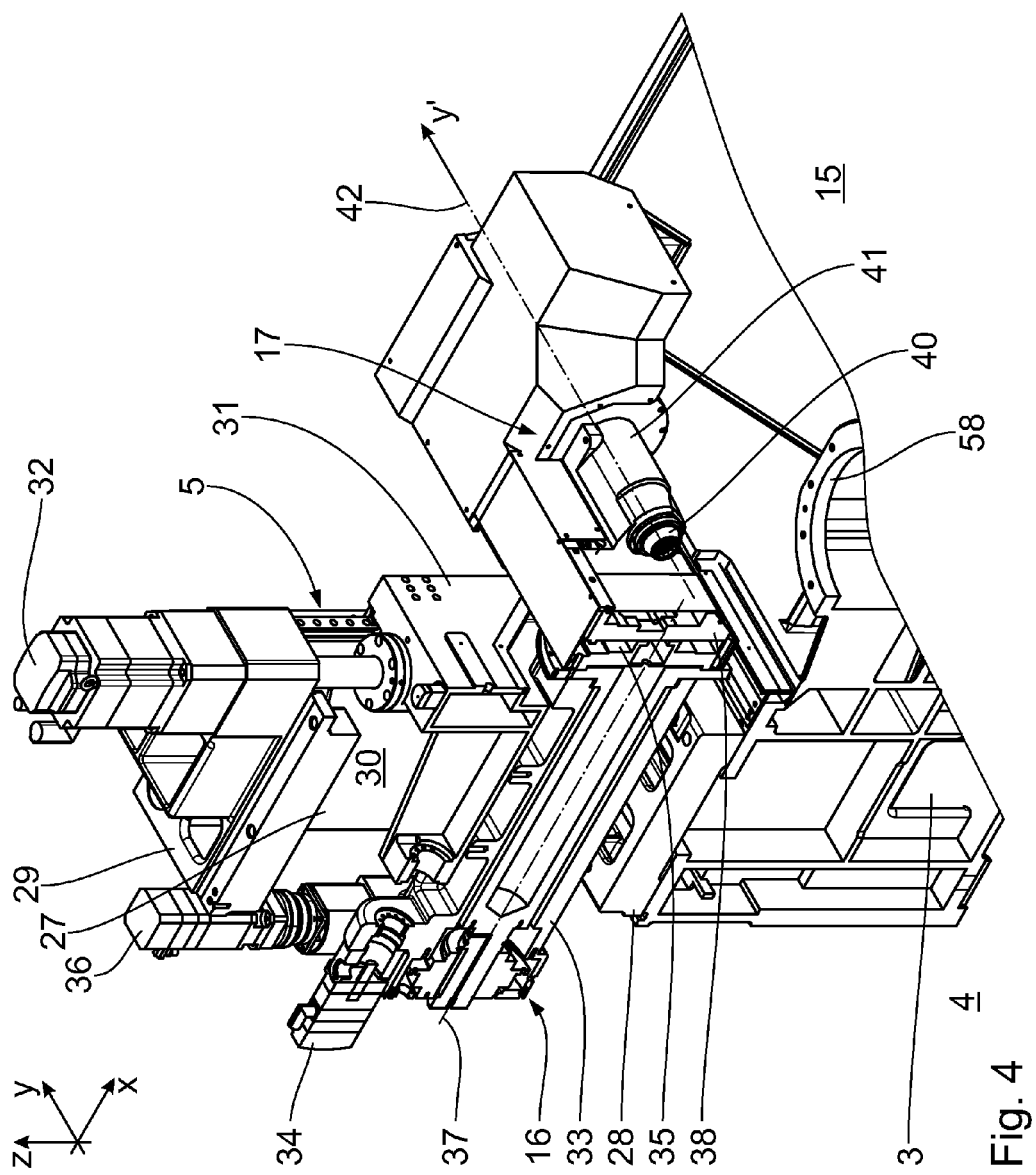
FIG. 4 shows a perspective sectional view through a tool positioning unit of the machine tool in FIG. 1.

A machine tool 1 shown in FIGS. 1 to 4 is used for producing and machining toothed sections on workpieces 2. The machine tool 1 has a machine bed 3, which extends substantially in a horizontal x-direction and a horizontal y-direction. The machine bed 3 stands on a base plate 4 and can be fastened thereto.

A stand 5 extending substantially in a vertical z-direction is fastened to a first end of the machine bed 3. Arranged on an opposing second end of the machine bed 3 is an associated counter-stand 6, which is formed by a pivoting element 7 and a bearing element 8 arranged thereon. The pivoting element 7 is mounted on the machine bed 3 and can be pivoted by means of a drive motor 9 about a workpiece spindle pivot axis 10. The workpiece spindle pivot axis 10 runs parallel to the z-direction and will be called the c1-axis below. The pivoting element 7 can be pivoted by at least 180° about the c1-axis 10, preferably by a maximum of 360°. In accordance with the c1-axis 10, the drive motor 9 will be called the c1-drive motor below. The pivoting element 7 is also called the pivoting or rotary holder or spindle drum. The x-, y- and z-directions in each case run perpendicular to one another and form a Cartesian coordinate system.

The bearing element 8 extends substantially in the direction of the c1-axis 10 and is rigidly fashioned on the pivoting element 7, so the two elements 7, 8 can be pivoted together about the c1-axis 10. The free end 11 of the bearing element 8 remote from the pivoting element 7 is mounted in a cross member 12, which runs substantially in the x-direction and is rigidly connected to the stand 5. The stand 5 and the cross member 12 form an L-shaped reinforcing element 13, which is rigidly connected to the machine bed 3 and rotatably connected to the bearing element 8 and thus reinforces the pivoting element 7 about the c1-axis 10.

The machine bed 3, together with the pivoting element 7 and the bearing element 8 arranged thereon and with the reinforcing element 13, forms a reinforcing frame 14, which limits a working space 15 on four sides. The working space 15 is open on the two sides not limited by the reinforcing frame 14. A tool positioning unit 16 is arranged on the stand 5 of the reinforcing element 13 or of the reinforcing frame 14. The tool positioning unit 16 extends into the working space 15 and carriers a tool head 17, which is arranged in the working space 15. Two workpiece spindles 18, 19 are arranged on the pivoting element 7 opposing the tool head 17. The workpiece spindles 18, 19 can be pivoted together relative to the machine bed 3 by means of the pivoting element 7 about the c1-axis 10. The workpiece spindles 18, 19 have associated workpiece receivers 20, 21, which can be rotatably driven by means of drive motors 22, 23 about associated rotational axes 24, 25. The workpiece receivers 20, 21 are used to receive and clamp a workpiece 2 to be toothed. The rotational axes 24, 25 run parallel to the c1-axis 10 and the z-direction and will be called the c2-axis and c3-axis below. Accordingly, the drive motors 22, 23 are called the c2- and c3-drive motors.

The stand 5 is frame-shaped to mount the tool positioning unit 16. For this purpose, the stand 5 has two longitudinal supports 26, 27 running in the z-direction and two transverse supports 28, 29 connecting them and running in the y-direction, which limit a through-opening 30. Mounted on the end faces of the longitudinal supports 26, 27 facing the working space 15 is a z1-slide 31, which can be moved linearly in the z-direction by means of a z1-drive motor 32. Mounted on the z1-slide 31 is an x-slide 33, which can be linearly moved in the x-direction by means of an x-drive motor 34. The x-slide 33 is configured as a sleeve and extends into the through-opening 30. Arranged on the x-slide 33 is a pivoting part 35 that can be pivoted by means of an a-drive motor 36 about a tool head pivot axis 37. The tool head pivot axis 37 will also be called the a-axis below. Mounted on the pivoting part 35 is a y-slide 38, which can be linearly moved in a y'-direction by means of a y-drive motor 39. The y'-direction runs transverse to the x-direction and the z-direction. In a horizontal pivoting position of the y-slide 38, the y'-direction runs parallel to the y-direction. Depending on the pivoting angle of the pivoting part 35 about the a-axis 37, the y'-direction runs at an acute angle to the y-direction. The tool head 17 is fastened to the y-slide 38. The tool head 17 can therefore be linearly moved in three directions relative to the workpiece spindles 18, 19 and can be pivoted about the a-axis 37.

The tool head 17 has a tool receiver 40, which can be rotatably driven by means of a b-drive motor 41 about a rotational axis 42. The rotational axis 42 is also called the b-axis. Arranged concentrically with respect to the b-axis 42 is a rotatably mounted tool counter receiver 43, which can be linearly moved relate to the tool receiver 40. The linear movement of the tool counter-receiver 43 takes place, for example, electromechanically or pneumatically. A hob 44 is mounted on both sides in the tool receiver 40 and the tool counter-receiver 43 and can be rotatably driven by means of the b-drive motor 41 about the b-axis 42. The b-axis 42 runs parallel to the y'-direction.

The counter-stand 6 is frame-shaped, corresponding to the stand 5. For this purpose, the bearing element 8 has two longitudinal supports 45, 46 running in the z-direction, which are fastened spaced apart from one another on the pivoting element 7 and are connected to one another at the free end 11 by means of a cross member 47. The counter-stand 6 thus forms a through-opening 48. A z2-slide 49 and a z3-slide 50 are mounted on the longitudinal supports 45, 46 in the region of opposing end faces. The z2-slide 49 can be linearly moved in the z-direction by means of an associated z2-drive unit 51, so a workpiece counter-receiver 52 arranged on the z2-slide 49 is linearly movable. The workpiece counter-receiver 52 is arranged so as to be rotatable and concentric with respect to the c2-axis 24. Accordingly, the z3-slide 50 can be linearly moved in the z-direction by means of a z3-drive unit 53, so a workpiece counter receiver 54 can be linearly moved relative to the workpiece receiver 21. The workpiece counter receiver 54 is arranged so as to be rotatable and concentric with respect to the c3-axis 25. The workpiece counter-receivers 52, 54 are preferably configured as tailstocks.

To change the tool, a tool magazine 55, which has a plurality of tool holders 56 arranged above one another in the z-direction for further hobs 44, is arranged on the longitudinal support 45. The tool magazine 55 is only shown in FIGS. 1 and 2.

To transport chips occurring during workpiece machining away, a chip conveyor 57 is arranged in the region of the machine bed 3 below a drop opening 58. The machine bed 3 is at least partially funnel-shaped in the direction of the drop opening 58.

A control unit 59 is provided to control the machine tool 1 and to produce and machine toothed sections on workpieces 2.

The mode of functioning of the machine tool 1 is as follows:

To produce a toothed section on a workpiece 2, the latter is firstly arranged manually or by means of a handling device on the workpiece receiver 20 and clamped in on both sides by means of the workpiece counter-receiver 52 by moving the z2-slide 49. The counter stand 6 is then pivoted by 180° about the c1-axis 10, so the workpiece 2 arrives in the working space 15. By means of this pivoting, a workpiece 2, which is clamped in the workpiece receiver 21 and the workpiece counter-receiver 54 and has been completely machined, is conveyed out of the working space 15 and can now be unloaded manually or by means of the handling device. After unloading, the workpiece spindle 19 can be equipped with a new workpiece 2 to be machined.

The workpiece 2 located in the workpiece spindle 18 is rotatably driven about the c2-axis 24 for toothing. The toothing of the workpiece 2 takes place in the usual manner by rotatably driving the hob 44 about the b-axis 42 and by linearly moving the hob 44 in the x- and z-direction and optionally in the y'-direction. To produce oblique toothed sections, the hob 44 is pivoted about the a-axis 37, so the y'-direction encloses an acute angle with the y-direction.

Forces and vibrations occurring when producing and machining toothed sections are guided away via the stand 5 and the counter-stand 6 into the machine bed 3. In particular the c1-axis 10 of the counter-stand 6 and the c2-axis 24 of the workpiece spindle 18 and the c3-axis 25 of the workpiece spindle 19 are reinforced by the cross member 12, so forces and vibrations during the machining no longer lead to a deflection of the c1-axis 10 and/or of the c2-axis 24 or of the c3-axis 25 relative to the z-direction. At the same time, owing to the closed reinforcing frame 14, the stand 5 is also reinforced, so forces and vibrations during the machining do not impair the positioning precision of the workpiece positioning unit 16 and of the tool head 17 arranged thereon. The thermal behavior of the machine tool 1 and the vibration behavior are also improved by the closed reinforcing frame 14 or the closed frame structure. In particular vibrations occurring during the machining are better damped or do not occur at all.

Once the workpiece 2 has been completely machined, the counter-stand 6 is again pivoted by 180° about the c1-axis 10, so the workpiece 2 located in the workpiece spindle 18 and completely machined is removed from the working space 15 and the workpiece 2 located in the workpiece spindle 19 and to be machined is arranged in the working space 15. The machining described above is now repeated. Since two workpiece spindles 18, 19 are arranged on the pivoting element 7, short downtimes are achieved. Moreover, because of the closed frame structure and the rigidity connected therewith, the machining speed of the workpieces 2 can be increased, so the machining period or the main time is shortened. In total, the machine tool 1 has a high productivity and machining precision during the toothing of workpieces 2.

Furthermore, the machine tool 1 easily allows a fully automatic tool change. At least one new hob 44 and an empty space or an empty tool holder 56 are provided for a tool change in the tool magazine 55. To change the tool, the counter-stand 6, proceeding from the described machining position, is pivoted by 90° about the c1-axis 10, so the tool magazine 55 is arranged in the working space 15. The hob 44 that is clamped in the tool head 17 and worn is then oriented about the a-axis 37 in such a way that the b-axis 42 runs parallel to the y-direction. The worn hob 44 is now deposited in a free tool holder 56 by moving in the x- and z-direction and the tool receiver 40 and the tool counter-receiver 43 are released. By moving the tool counter-receiver 43 and/or the y-slide 38, the worn hob 44 is removed from the tool head 17. For this purpose, the worn hob 44 can optionally be clamped in the tool holder 56. The tool head 17 is then moved by movement in the x- and z-direction to the new hob 44. By moving the tool counter-receiver 43 in the y-direction, the new hob 44 is pushed into the tool receiver 40 and clamped therein and in the tool counter-receiver 43. The new hob 44 is then removed from the tool holder 56 by movement in the z-direction and moved to the stand 5 by movement in the x-direction. By means of renewed pivoting of the counter-stand 6 by 90°, a workpiece 2 to be machined is now arranged in the working space 15. The fully automatic tool change has now ended, so the toothing of workpieces 2 can be continued.

During the machining of workpieces 2, the worn hob 44 can be removed manually or by means of a handling device from the tool holder 56 and replaced by a new hob 44. Owing to the automatic tool change, long operator-free machine times are achieved, so the productivity of the machine tool 1 is again increased. In addition, problems caused by a manual tool change, such as, for example, undefined non-operation periods, quality fluctuations during the tool change and physiological work stresses for the operator, can be avoided. The machine-related outlay for the automatic tool change is small.

To carry out further machining steps, a further stand, which is reinforced by means of the cross member 12 and forms a part of the reinforcing element 13, may be arranged on the machine frame 3. Further tools, which are used, for example, for deburring and/or chamfering the workpieces 2, may be arranged on this stand by means of further tool positioning units.

What is claimed is:

1. A machine tool for producing toothed sections on workpieces, the machine tool comprising:
   a machine bed;
   a pivoting element with at least two workpiece spindles arranged thereon, wherein one end of the pivoting element is pivotably mounted to the bed, wherein the pivoting element and the at least two workpiece spindles are pivotable relative to the machine bed about a workpiece spindle pivot axis of the pivoting element, and the at least two spindles each have a respective workpiece receiver that is rotatably drivable about a respective rotational axis for a respective workpiece to be toothed, and wherein the pivoting element has an opposite end spaced along the workpiece spindle pivot axis from said one end;
   a tool positioning unit with a tool head arranged thereon, wherein the tool head is linearly movable relative to the at least two workpiece spindles along three axes, and the tool head is pivotable about a tool head pivot axis;
   a bearing element extending from said opposite end of said pivoting element and in the direction of the workpiece spindle pivot axis and being rigidly arranged on the pivoting element for rotation with the pivoting element about the workpiece spindle pivot axis, the bearing element having one end that is connected to the pivoting element and having an opposite end spaced along the workpiece spindle pivot axis from said one end of said bearing element; and,
   wherein said opposite end of the bearing element is pivotably mounted to a reinforcing element so as to pivot about the workpiece spindle pivot axis, wherein the reinforcing element is fastened to the machine bed, wherein the reinforcing element includes a stand and a cross member, wherein the tool positioning unit is movably mounted on the stand, and the cross member connects the stand to said opposite end of the bearing element.

2. A machine tool according to claim 1, wherein the machine bed, together with the pivoting element, the bearing element arranged thereon, and the reinforcing element form a reinforcing frame, the reinforcing frame limiting a working space on four sides.

3. A machine tool according to claim 1, wherein the tool positioning unit extends through the reinforcing element.

4. A machine tool according to claim 1, wherein the reinforcing element is L-shaped, and wherein the stand is rigidly fastened to the machine bed and extends in a vertical z-direction.

5. A machine tool according to claim 4 further comprising:
   a z-slide arranged on the stand, wherein the z-slide is linearly movable in the z-direction by means of a z-drive motor.

6. A machine tool according to claim 5 further comprising:
   an x-slide arranged on the z-slide, wherein the x-slide is linearly movable in a horizontal x-direction by means of an x-drive motor.

7. A machine tool according to claim 6 further comprising:
   a pivoting part arranged on the x-slide, wherein the pivoting part is pivotable by means of an a-drive motor about the tool head pivot axis, which tool-head pivot axis is parallel to the x-direction.

8. A machine tool according to claim 7 further comprising:
   a y-slide arranged on the pivoting part, wherein the y-slide is linearly movable transverse to the x- and z-directions by means of a y-drive motor.

9. A machine tool according to claim 8, wherein the tool head is arranged on the y-slide.

10. A machine tool according to claim 1, wherein the workpiece spindle pivot axis extends in a vertical z-direction, and wherein the pivoting element, together with the bearing element, forms a pivotable counter-stand.

11. A machine tool according to claim 1, wherein the reinforcing element includes a frame.

12. A machine tool according to claim 1, wherein the stand of the reinforcing element includes a frame, and wherein the tool positioning unit is mounted in a through-opening of the stand.

13. A machine tool according to claim 1, the tool head further comprising:
   a rotatably drivable tool receiver and a rotatable tool counter-receiver for a hob, wherein the rotatably drivable tool receiver and a rotatable tool counter-receiver are linearly movable relative to one another to clamp and release the hob.

14. A machine tool according to claim 1 further comprising:
   a plurality of rotatable workpiece counter-receivers, each of the rotatable workpiece counter-receivers arranged concentrically with respect to a respective one of the rotational axes of a respective one of each of the at least two workpiece spindles.

15. A machine tool according to claim 14, wherein the rotatable workpiece counter-receivers are each linearly movable in a vertical z-direction.

16. A machine tool according to claim 1, wherein the bearing element together with the pivoting element forms a frame.

17. A machine tool according to claim 1, wherein the bearing element together with a counter-stand forms a frame.

18. A machine tool according to claim 1 further comprising:
   a tool magazine arranged on the bearing element.

\* \* \* \* \*